Oct. 9, 1951      G. WILKES      2,570,893
ELECTRONIC ATTENUATOR FOR RADAR
Filed Dec. 18, 1947      2 Sheets-Sheet 1
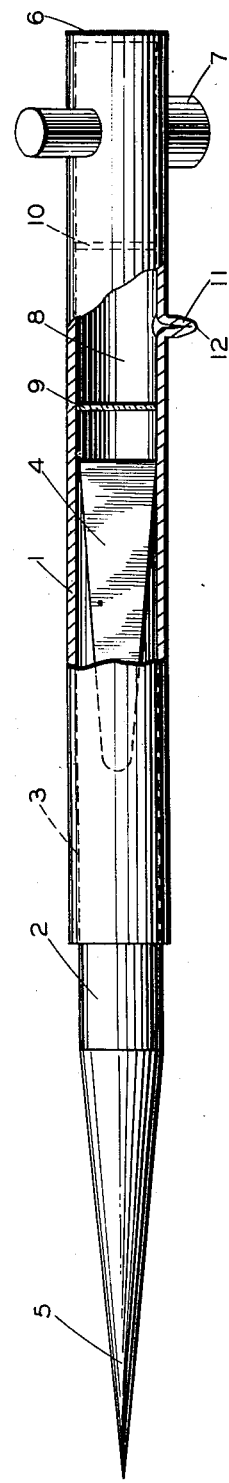
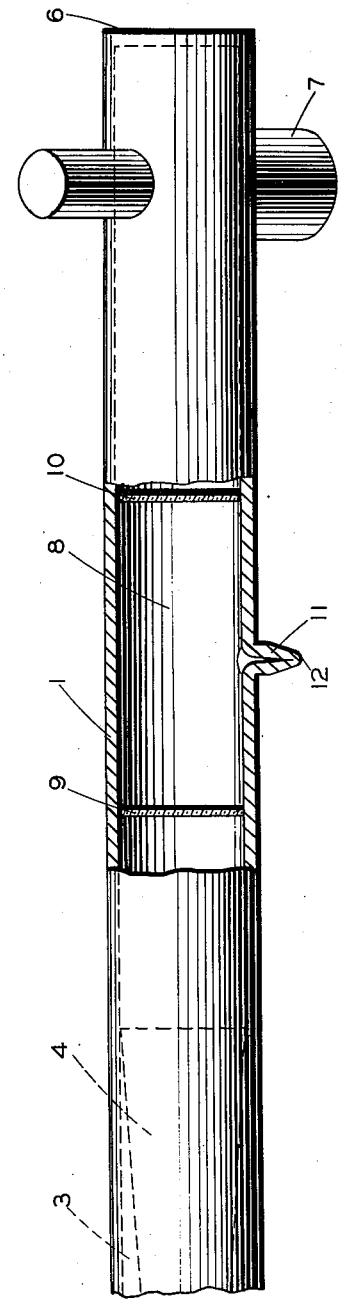
*INVENTOR.*
GILBERT WILKES
BY *J. D. O'Brien*
ATTORNEY Oct. 9, 1951            G. WILKES           2,570,893

ELECTRONIC ATTENUATOR FOR RADAR

Filed Dec. 18, 1947                        2 Sheets-Sheet 2

*INVENTOR.*
GILBERT WILKES
BY
ATTORNEY

Patented Oct. 9, 1951

2,570,893

UNITED STATES PATENT OFFICE 2,570,893

ELECTRONIC ATTENUATOR FOR RADAR

Gilbert Wilkes, Chevy Chase, Md., assignor to the United States of America as represented by the Secretary of the Navy Application December 18, 1947, Serial No. 792,465

5 Claims. (Cl. 250—20)

The present invention relates to radar.

More specifically, it relates to means for protecting the crystal detector of a radar receiver against injury from powerful impulses received when in operation in the vicinity of a radar transmitter.

An object of the invention is not only to provide means to attenuate the received energy before it reaches the crystal, but to provide an attenuator, the characteristics of which are such that while it effectively reduces the intensity of powerful impulses to a level which will not harm the crystal, yet it interposes practically no obstruction in the path of the relatively faint normal echo signals and thus does not affect the receiver sensitivity adversely.

This is accomplished by employing an ionizable gaseous material at reduced pressure, in the path of the received energy, the nature and pressure of said gaseous material being selected to produce a dense cloud of ions when subjected to radar impulses of sufficient intensity, said cloud then acting practically like a metal, to reflect the energy.

While gaseous tubes have been used heretofore as transmit-receive "TR" switches, such devices always had an auxiliary discharge means therein, known as a "keep-alive," and this necessitated a power supply to energize such keep-alive and supply the ions necessary to ensure starting of the main discharge. One form of the present invention does not require the keep-alive means, and thereby dispenses with this complication, at the same time making it unnecessary to carry along a power supply, which is an important advantage in guided missiles, wherein space and weight must be kept to a minimum.

A modified form of the invention relates to attenuators serving the functions usually exercised by "TR" tubes in radar apparatus, namely, to prevent the powerful transmitter pulses from reaching and injuring the crystal detector, and optionally in combination with a function of automatic gain control, without interfering with the proper operation of the detector in response to faint signals.

An object of the modified form of the invention is to provide a small and compact protective attenuator and gain control which may be located in a wave guide associated with a guided missile.

Other objects and advantages of the invention will be mentioned in the course of the present disclosure and still others will be self-evident.

The invention will be understood from the present specification and the accompanying drawing, showing the forms at present preferred. In said drawing:

Figure 1 is a side view of a tubular antenna, constructed in accordance with the invention;

Figure 2 is a corresponding view of the right-hand half thereof, on a larger scale.

Figure 3:
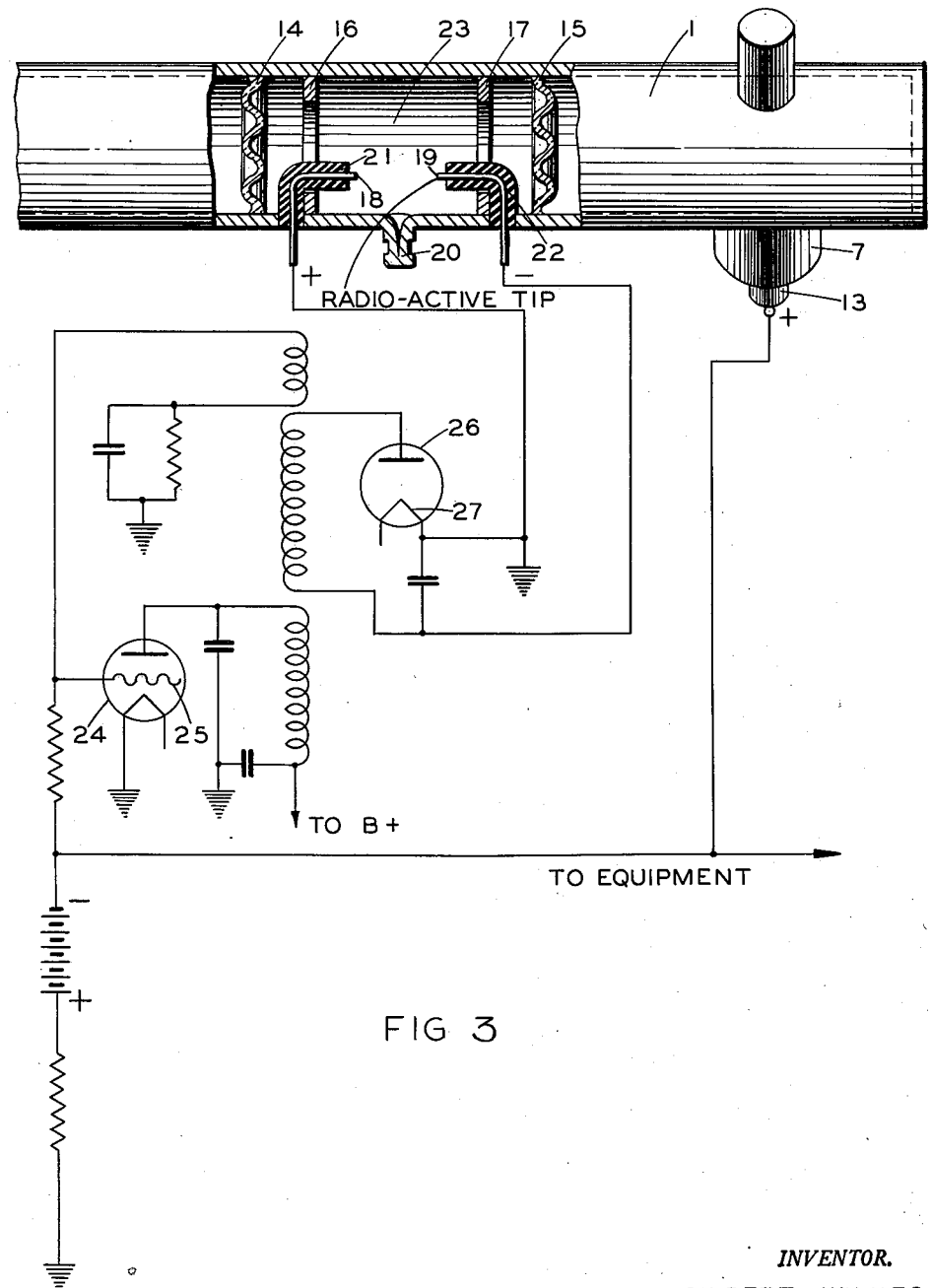
Figure 3 is a diagram showing a modified form of the invention.

Referring more particularly to Fig. 1, the device consists of a tube 1 carrying a dielectric lens 2, which is shown as a cylindrical rod of dielectric material, such as polystyrene, for example, that has a portion 3 inserted within the tube 1, and which has a flattened or "fish-tail" end 4, the other end of said lens projecting beyond the end of the tube 1, and having a substantially conical point 5.

The tube 1 is closed at its rear end, as shown at 6, and near said closure 6 has a holder 7, for a crystal detector.

Referring now to Figs. 1 and 2, there is shown a gas chamber 8, formed by a portion of the tube 1 that is sealed off from the remainder by the partitions 9 and 10, preferably made of glass, which form vacuum-tight joints with the inner wall of tube 1. A side tube 11, in communication with the chamber 8, affords means for evacuating said chamber and for introducing a suitable gas or mixture of gases and/or vapors into said chamber, after which the tube may be sealed off, as shown at 12.

The aeriform contents of chamber 8, and its pressure, are preferably selected to provide easy ionization thereof, materials such as argon, neon, mercury vapor, and/or suitable mixtures of these or other monatomic materials being preferred, and provided at a pressure of a few millimeters of mercury; for example, argon-neon mixtures, as used in fluorescent lamps, are usually found satisfactory. The term "aeriform," as employed here, is generic and includes gases and/or vapors.

While the physical dimensions of the chamber 8 and/or the rest of the structure may vary materially, it should be understood that the characteristics of the antenna are governed by the wave length for which it is to be used, and many dimensions are thus predetermined directly by said wave length.

The operation of the antenna is as follows:

When a weak radar signal such as an echo or one from a distant transmitter enters the tubular guide 1 through the lens 2, the crystal in the holder at 7 will respond in the usual way, and the gaseous charge in chamber 8 will have no effect thereon, since the signal is too weak to produce ionization.

However, when the transmitter is close, the relatively strong pulses entering the antenna will cause ionization of the chamber contents to occur. This produces a dense cloud of ions and/or electrons in the chamber 8, which provide metal-like reflection of the incoming wave, which is thus attenuated automatically.

The energy level at the location of the crystal thus is kept automatically at or below a safe value, and injury to the crystal is prevented, at all energy levels.

The present device is noteworthy for its extreme simplicity, in that it requires no leads of any nature to the chamber 8, and no keep-alive or similar device, thus at the same time eliminating the need of a power source for the same. The spacing of the partitions 9 and 10 moreover affords means for correcting any mismatching caused by the crystal.

Referring now to the modified form shown in Fig. 3, it will be seen that the chief difference from the structure above described consists in the provision of electrodes, and means for producing a discharge between them.

In this form of the invention, the end portion of a tubular wave guide 1 has a crystal holder 7 mounted therein in the usual way, to house the crystal detector 13. Partitions 14 and 15, made of glass or other dielectric material, are located in the wave guide 1 as shown, and form between them a chamber 23, sealed hermetically from the rest of the interior of the tubular guide.

As shown in Fig. 3, circular corrugations may be provided in the partition discs 14 and 15 to give them greater flexibility and thus reduce the chance of fracture. These discs may be sealed to the wall of the wave guide in any suitable way. Diafragms 16 and 17 may be placed within the chamber 23, preferably spaced ⅜ wavelength apart, and electrodes 18 and 19 pass through the openings of these diafragms as shown.

The chamber 23 has a tubular side connection 20 which may be used to evacuate the said chamber to any desired extent and/or to introduce thereinto a vapor or gas, or mixture of gases and/or vapors at any preferred pressure to facilitate the passage of electricity between the ends of electrodes 18 and 19. This tube 20 will, of course, be hermetically sealed, as by squeezing, followed by solder or fusion, after the atmosphere within chamber 23 has been adjusted properly as to composition and pressure.

The electrodes 18 and 19, which are covered with insulation, as shown at 21 and 22, are introduced through the wall of the wave guide 1. This insulation may be fused or cemented to the wall of the wave guide, or sealed thereto in any other manner that will form a mechanically strong, gas-tight joint.

The inner tip of electrode 19, which constitutes the cathode, preferably has radioactive material applied thereto, for example, meso-thorium or the like, to facilitate starting the discharge. It will be noted that the tips of electrodes 18 and 19 are directed toward each other within the chamber 23 and are spaced closely enough to cause the discharge to take place between said tips instead of jumping to the inner wall of the wave guide.

The above construction of the evacuated chamber gives it a response that is essentially broad-banded, and therefore may be preferred where wide ranges of frequency variation are to be expected. The principal drawback of this construction is that it requires a relatively large flow of current to fill the active space with an electron cloud, sufficiently dense to obtain a high degree of attenuation. An alternative structure is one that provides around the electrodes a sharply tuned cavity, by suitably restricting the partitions 14 and 15 so as to constitute diaphragms or "stops," or else to provide separate stops, as shown at 16 and 17. These stops, when properly chosen with respect to the electrode structures, convert the broad band cavity of the cylindrical wave guide into a sharply tuned resonant cavity, and greatly reduce the current flow required to secure the same degree of attenuation. Such a structure, however, has a very narrow-banded response and is suitable for use only where the frequency of the incoming wave is held constant within narrow limits.

While the embodiment of Fig. 3 shows the simplest type of "built-in" cavity structure, to illustrate the principle of the invention, it is evident that the attenuating cavity may be made up as a separate unit designed to be inserted in the wave guide at any stage of fabrication, and that the electrodes may be located either longitudinally in the chamber as shown, or transversely, whichever arrangement suits best both the desired operation of the cavity and the ease of construction, without departing from the principle of the invention. The cross-section of the associated wave guide may be circular or rectangular, and that of the attenuating cavity likewise may be rectangular or circular, without changing the fundamental attenuation characteristic obtained.

When automatic gain control is not desired, the electrodes and power source may be omitted entirely, as shown in Fig. 2. The attenuating space then will ionize spontaneously from the voltage existing therein whenever a wave of sufficient energy traverses it. When ionized, the attenuating space acts to reflect most of the energy contained in the incoming wave and thus prevents the wave from transmitting sufficient energy to the crystal to damage the latter. When used in this manner, the invention provides a very simple and automatic means of crystal protection. It is objectionable, however, in many applications because the attenuation produced is proportional to the energy of the incoming signal and therefore it tends to decrease or render undetectable the modulation existing in waves sufficiently intense to operate the attenuator. To obtain adequate crystal protection in automatic attenuators of this type, it is necessary to design the attenuating space to secure the easiest possible ionization and this obviously acts to limit still further the maximum energy at which proper detection of modulation is obtainable.

When used for automatic gain control, the electrodes producing the electron stream are connected to any suitable power pack, an example of which is shown schematically in Fig. 3. This shows a conventional radio-frequency rectifier pack using a grid-controlled oscillating tube 24. When the grid of the latter is very negative, the oscillator output is insufficient to fire the at-25 of the oscillator tube 24 is driven less negative tenuating tube. To obtain attenuation, the grid by a positive crystal signal from the crystal detector 13, and as the voltage of the latter is generally not sufficient to secure the required response directly, an amplifier stage (not illustrated) may be introduced between the oscillator grid and the crystal terminal. The output of the power supply, taken from the cathode 27 of diode 26, is fed to terminal 18 in order to start the discharge and cause automatic attenuation of the signal in response to any increase in the crystal output. Considerable latitude is available in the choice of a power supply; for example, batteries of selected voltages, as well as various power packs, have been used successfully. The crystal signal in the circuit illustrated is positive to ground, and this may be changed to negative by reversing the crystal connections. To allow full detection of modulation, the response of the attenuation to the crystal output may be retarded by suitable time-lag circuits, so that the automatic gain control does not affect appreciably the modulation of the signal but varies merely the average energy level of the latter, to avoid crystal saturation during peaks of the modulated signal.

Inasmuch as various modifications may be made in the structures and arrangements of parts without departing from the spirit of the invention, it should be understood that the present disclosure constitutes merely an illustration of the invention, and not a limitation thereof. The invention is defined solely in and by the following claims:

What is claimed is:

1. The combination, in a radar receiver, of a wave guide defining the path of the received energy, a detector located within the end of the wave guide remote from the source of the said energy, whereby said received energy must traverse the wave guide before reaching the detector, an electrical discharge tube whose discharge space extends completely across the internal cross section of the wave guide, said discharge tube having discharge electrodes therein, and means responsive to the detected energy for controlling the intensity of the discharge between said electrodes.

2. The combination recited in claim 1, wherein said means includes a source of power controlled by the detector output.

3. The combination, in a radar receiver, including a wave guide through which the received signal energy must pass, of a detector, located within the end of the wave guide remote from the source of the said energy, whereby said received energy must traverse the wave guide before reaching the detector, a controllable electrical discharge tube having its discharge space filled with an aeriform ionizable material, said tube having electrodes and being placed in the wave guide to fill the entire internal cross section thereof, whereby substantially all the received signal energy must pass through said discharge space to reach the detector, a power supply furnishing electricity to energize said electrodes, and means controlled by the signal energy received by the detector for controlling the said power supply.

4. The combination defined in claim 3, wherein the power supply includes an electron discharge tube having a control grid, and the means for controlling the power supply comprises a circuit for deriving a bias voltage for said grid from the detector output.

5. The combination, in a rader receiver, of a detector, said receiver including a wave guide within which the detector is located and through which the received energy passes on its way to said detector, a controllable electrical discharge tube having its discharge space filled with an aeriform ionizable material, said tube having cold electrodes and being placed in the receiver to include the entire internal cross section of the wave guide within its said discharge space, whereby substantially all the received signal energy must pass through said discharge space to reach the detector, a power supply for energizing said electrodes to produce a discharge through said tube, said power supply including a grid-controlled thermionic oscillator, and a circuit deriving a bias voltage from the detector output and supplying it to the grid of said oscillator in such polarity that the osciallator output increases upon increase of the detector output, thereby increasing the intensity of the discharge in the discharge tube, and consequently increasing the impedance offered to the said received signal energy, and providing automatic gain control, to keep the detector input at a safe level.

GILBERT WILKES.

REFERENCES CITED

The following references are of record in the file of this patent:

UNITED STATES PATENTS

| Number | Name | Date |
| --- | --- | --- |
| 2,045,542 | Koch | June 23, 1936 |
| 2,047,929 | Linder | July 14, 1936 |
| 2,085,117 | Morrison et al. | June 29, 1937 |
| 2,106,770 | Southworth | Feb. 1, 1938 |
| 2,144,995 | Pulvari-Pulvermacher | Jan. 24, 1939 |
| 2,378,604 | Wallace | June 19, 1945 |
| 2,403,303 | Richmond | July 2, 1946 |
| 2,412,446 | De Walt | Dec. 10, 1946 |
| 2,413,171 | Clifford et al. | Dec. 24, 1946 |
| 2,422,190 | Fiske | June 17, 1947 |
| 2,433,387 | Mumford | Dec. 30, 1947 |
| 2,505,534 | Fiske | Apr. 25, 1950 |